C. W. BAIN.
TIRE TREAD PROTECTOR.
APPLICATION FILED FEB. 11, 1918.

1,275,199.

Patented Aug. 13, 1918.
2 SHEETS—SHEET 1.

Inventor
C. W. Bain
By [signature]
Attorney

C. W. BAIN.
TIRE TREAD PROTECTOR.
APPLICATION FILED FEB. 11, 1918.
1,275,199.
Patented Aug. 13, 191
2 SHEETS—SHEET 2.
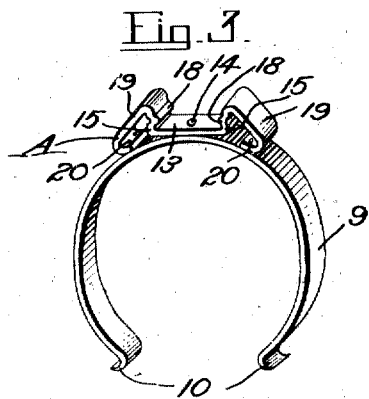
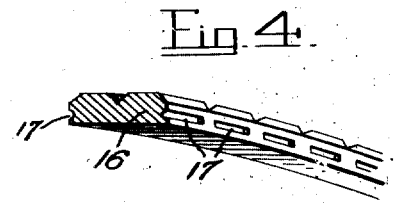
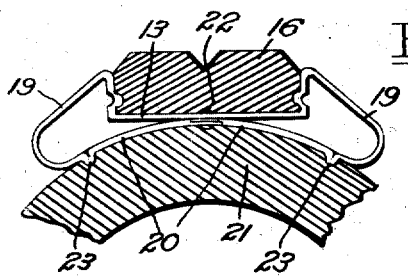
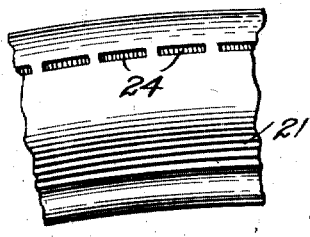
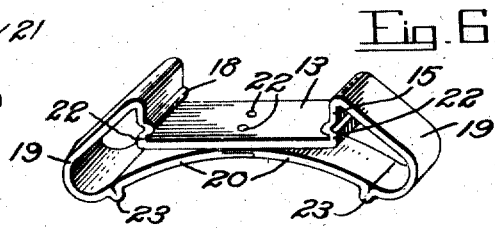
Inventor
C. W. Bain
By Frank Fuller
Attorney

UNITED STATES PATENT OFFICE.

CHARLES W. BAIN, OF NORFOLK, VIRGINIA.

TIRE-TREAD PROTECTOR.

1,275,199. Specification of Letters Patent. Patented Aug. 13, 1918.

Application filed February 11, 1918. Serial No. 216,441.

*To all whom it may concern:*

Be it known that CHARLES W. BAIN, a citizen of the United States, residing at Norfolk, in the county of Norfolk and State of Virginia, has invented certain new and useful Improvements in Tire-Tread Protectors, of which the following is a specification.

My invention relates to a tire protector in the form of a renewable tread device, means to prevent puncture and means to prevent blow-outs. While I generally aim to improve and simplify a construction of this character, yet I also provide various novel features and details of construction which will become apparent from the description hereinafter following, taken in connection with accompanying drawings, wherein one preferred embodiment is shown.

Figure 1:
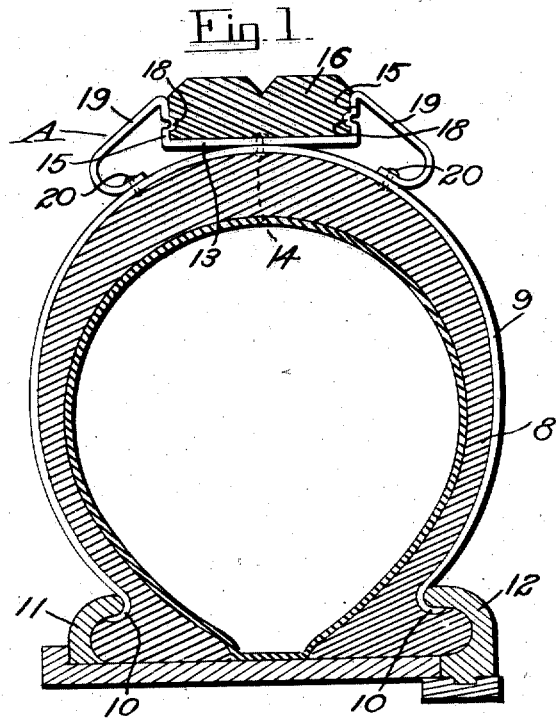
Figure 2:
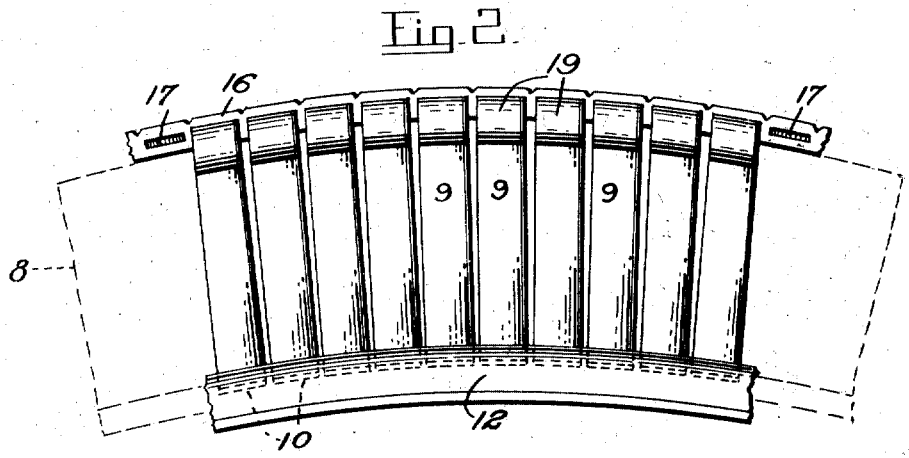

In these drawings, Figure 1 is a transverse sectional view through a pneumatic tire having my improvements applied thereto; Fig. 2 is a fragmentary side elevation of my improvements, in connection with a tire suggested by dotted lines; Fig. 3 is a perspective view of one of the tread holders secured to a fastening band which may be used to minimize the chances of blow-outs; Fig. 4 is a fragmentary perspective view of the renewable tread; Fig. 5 is a fragmentary transverse sectional view showing the use of a modified form of tread holder; Fig. 6 is a perspective view of said modified form of tread holder, and Fig. 7 is a fragmentary elevation of the form of tire shoe or casing used in connection with the said modified form of tread holder.

Referring particularly to the drawings, the normally exposed portion of a tire, for instance a pneumatic tire, as conventionally suggested at 8, is surrounded by independent U-shaped bands 9, each end of which terminates in a hook 10 adapted to engage the outer edges of the fastening rings 11 and 12 of the tire. When the tire is inflated, it bears against the hoops 10 as is obvious, thereby effectively maintaining them in place. These bands 9 minimize the danger of puncture of the tire and as well, the danger of blow-outs.

Fastened to the bands 9 in any desired manner, are tread retainers or holders generally designated A. The form shown in Figs. 1 to 3 comprises a base plate 13 secured at its center as by means of a rivet 14 to the band 9. The band 9, as it will be noted from Fig. 1, in effect forms a fulcrum for the said plate 13 so that the plate may, on opposite sides of the rivet, yield toward the band. Extending outwardly from the plate 13, are walls 15. Plates 13 and walls 15 form U-shaped holders which removably receive a tread 16. The tread may be of any desired configuration and of any suitable material, and usually is principally of rubber reinforced by fabric or other material. As best shown in Figs. 1 and 4, the tread is provided with a plurality of recesses or pockets 17 in its sides into which projections 18 of the arms 15 clip. Extending outwardly from the arms 15 are suitably shaped strut arms 19 which may be fastened at their extremities by means of rivets 20 to the bands 9.

As a result of the construction described, an auxiliary tread for the tire is provided and the tire is also rendered substantially puncture and blow-out proof. The tread 16 at the same time is removably secured so that it may be removed whenever desired, and so that a new tread may be substituted when necessary. The tread and the bands 9 and tread holders are also flexible so as to be capable of yielding with the tire and yielding to perform the functions required in attaching and detaching the tread 16. In removing the tread 16, arms 19 are preferably manually pulled outwardly so as to disengage the projections 18 from the pockets 17.

A modified form is illustrated in Figs. 5, 6 and 7 in which the bands 9 are dispensed with. In this form, the tread holder and tread are of the same construction as that described except the strut arms 9 are extended to provide bridge pieces 20 to rest on the tread of the tire proper, here designated 21. The pieces 20 overlap at the center of the tire and by means of rivets 22 may be secured to the plate 13. Also, preferably at the junction of the strut arms 19 and the pieces 20, lugs 23 are provided adapted to clip yieldingly into pockets or recesses 24 provided in the tire as shown in Figs. 5 and 7. The engagement of projection 23 with recesses 24 prevents longitudinal and lateral movement of the tread and tread holders relatively to the tire.

Since I have described merely preferred embodiments of the invention, it is to be understood that such changes in details of construction of the invention as fall within the spirit and scope of the appended claims are reserved.

I claim:

1. A device of the class described having a carrier, a tread, a frame for the tread, strut means extending from the frame to brace the frame, and said strut means bearing against the tire under strain.

2. A device of the class described having a carrier, a tread, a frame for the tread, struts extending from the frame to brace the frame and at their inner ends extending inwardly toward each other, and said struts bearing against the tire under strain.

3. A protector having a substantially curved band mounted upon a tire, a tread, a carrier, means to removably mount the tread in the carrier, said means being yieldable, said carrier intermediate its ends being secured to the band to facilitate yielding adjacent its ends independently of and relative to the band to receive or remove a tread.

4. A device of the class described, having a carrier, a tread member, a frame member, on the carrier receiving the tread member, and interfitting securing means between said members to prevent circumferential movement of the tread independently of the carrier and being yieldable for the purpose specified.

5. In a device of the class described, a carrier, a tread, a frame on said carrier receiving said tread, and resilient strut means associated with the frame.

6. A device of the class described, having a carrier provided with a frame, a tread carried by the frame, a band upon which said carrier is mounted, said frame being spaced from the band at its ends, and resilient strut means extending from the frame and engaging the band.

7. In a device of the class described, a band, said band having a substantially curved portion, a carrier having a frame provided with a plate resting on said band at the center of the plate and being spaced from the band at the ends of the plate, a tread insertible between said arms, and resilient strut arms extending outwardly from said arms, and means to secure the strut arms to said band.

In testimony whereof I affix my signature in the presence of two witnesses.

CHARLES W. BAIN.

Witnesses:
PAUL M. ALLEN,
J. B. DEY, Jr.